United States Patent

Fukata

[15] 3,639,839

[45] Feb. 1, 1972

[54] BROADCAST SYSTEM FOR A CONTROL SIGNAL

[72] Inventor: Masayuki Fukata, 94, Shimorenjaku, Mitaka-shi, Tokyo, Japan

[22] Filed: Sept. 16, 1969

[21] Appl. No.: 858,345

[30] Foreign Application Priority Data

Sept. 19, 1968 Japan....................................43/67286

[52] U.S. Cl...............................................................325/64

[51] Int. Cl..........................................................H04b 1/00

[58] Field of Search.......................325/41, 42, 53, 55, 64, 65, 325/364, 392; 179/15 AD, 2, 84 VF, 15 AP

[56] References Cited

UNITED STATES PATENTS

| | | | |
|---|---|---|---|
| 3,004,104 | 10/1961 | Hembrooke | 179/2 A |
| 3,273,069 | 9/1966 | Craig | 325/364 |
| 3,306,984 | 2/1967 | Leonard | 179/84 VF |
| 3,391,340 | 7/1968 | Fyler | 325/392 |
| 3,426,153 | 2/1969 | Kitsopoulos | 179/15 AP |
| 3,436,487 | 4/1969 | Blane | 179/84 VF |
| 3,566,270 | 2/1971 | Fukata | 325/64 |

*Primary Examiner*—Ralph D. Blakeslee
*Attorney*—Robert M. Dunning

[57] ABSTRACT

A system for controlling, from the sending side, the receiving side in a broadcast system using an intermittent control signal, where a false signal similar to the regular control signal is detected from the broadcast signals before the receiving side is spuriously triggered by the false signal, and elimination filter means is inserted in the path of the broadcast signal during only a predetermined time to eliminate the same frequency components as the control signal, whereby the control signal can be transmitted with no chance of spurious triggering. In this case, the false signal is detected from the broadcast signals by the use of a first decision means for deciding false signals having only spaces each less than a first time $t_1$ as a single group of false signals, a second decision means for deciding successive two groups of false signals detected by the first decision means as "continuous" if a space between the successive two groups of false signals is less than a second time $t_2$ longer than the first time $t_1$ and for deciding the later of the successive two groups of false signals detected by the first decision means as a new group of false signals if a space between the successive two groups of false signals is longer than the second time $t_2$, and a third decision means for deciding a predetermined state just before the possible spurious triggering of the receiving side by counting the number of "-continuous" groups of false signals.

3 Claims, 9 Drawing Figures

INVENTOR.
Masayuki Fukata
BY
Robert M. Dunning

INVENTOR.
Masayuki Fukata
BY

INVENTOR.
Masayuki Fukata
BY

INVENTOR.
Masayuki Fukata
BY
Robertson Dunning

INVENTOR.
Masayuki Fukata
BY
Robert M. Dunning

BROADCAST SYSTEM FOR A CONTROL SIGNAL

This invention relates to a broadcast system for control information to control, from the sending side, the receiving side in a broadcast system, and more particularly to a system for preventing erroneous triggering by spurious signals in a broadcast system for control information; such as (1) an emergency broadcast system for transmitting emergency information, such as information of a natural disaster etc., from the broadcast station to the receivers; (2) a recorder-control broadcast system for causing recorders of the receivers, such as tape recorders, to record the broadcast information in accordance with the control of the broadcast station; or (3) a broadcast system for a control signal transmitted to control the switch operation of each of various kinds of apparatus at the receiving side.

In the convention system of the type (e.g., the emergency broadcast system), the emergency control signal is sent out from the sending side, such as the broadcast station, before the broadcast of emergency information. In this case, if a broadcast program is being sent out, the emergency control signal is sent out together with the broadcast program. However, if the broadcast program is interrupted, only the emergency control signal is sent out. The emergency control signal is generally a continuous or intermittent wave or waves each having a predetermined frequency, or it may be a frequency-wobbled wave or waves in consideration of discordance among frequency characteristics of respective receiving selection circuits at the receivers. If there are many kinds of the emergency control signals to be transmitted, a plurality of signal waves are employed instead of a single wave. Amplitude modulation or frequency modulation may be employed as the modulation system of this case. The emergency information will be sent out after sending the above-mentioned emergency control signal.

On the other hand, the receiver side each providing with a receiving set, such as a radio receiving set or a television set, is established in the standby condition for receiving the emergency control signal. In other words, the video pattern and/or the audio output of the receiving set are/is not seen or heard because of the inactive state of the video circuit and/or the audio circuit. The receiving set is designed so that if an emergency control signal is transmitted from the sending side, the receiving-and-selection circuit of the emergency control signal provided at a receiver receives and selects only the transmitted emergency control signal and then actuates the video circuit and/or the audio circuit. Accordingly, if a predetermined emergency control signal is received at a receiver, the video circuit and/or the audio circuit of the receiver is switched from the inactive state to the active state in which the emergency information following after the emergency control signal can be received at the receiver's eyes and/or ears.

As mentioned above, since the receiving sets of the receivers are usually established in the standby condition, the receiving sets receive program information in addition to the normal control information of the emergency broadcast system. In this case, there is a fair chance for existence of a spurious signal like as the normal control signal in the program information. Moreover, in order to perform normal triggering for actuating reliably the low-frequency stage of the receiving set by a normal control signal to be transmitted, it is possible and necessary in actual cases that the selector circuit of the normal control signal in the receiving set has allowance to pass a like signal as the normal control signal even if the like signal is not completely identical with the control signal. It is the reason for this that, since characteristic values of elements forming the selector circuit for the control signal will be deviated in respective small deviation ranges due to fluctuations of the air temperature or of the voltage of the power source thereof, a desirable operation checking completely spurious signals below standards of the normal control signal cannot be realized in actual cases. In view of the situations, it is not avoidable in the emergency broadcast system that the selection circuit of the control signal provided at the receiving set has small possibility of spurious triggering in order to obtain the complete reliability of normal triggering. However, this small possibility of spurious triggering will increase undesirable complaint, such as "cry wolf too often," against the emergency broadcast system.

Accordingly, the most important problem of the emergency broadcast system is a fact that how we process an inconsistent idea for performing the complete normal control in avoiding completely spurious triggering. In this case, it is undesirable in consideration of the primary object of emergency broadcast system that the spurious triggering at the receiving side is completely eliminated at the sacrifice of the reliability on normal control. Accordingly, it is the only course open to us to attain completely the normal control even if the complete elimination of spurious triggering at the receiving side cannot be performed.

An object of this invention is to provide a broadcast system for control information capable of preventing the receiving side thereof from erroneous triggering by checking sufficiently like signals as the control information at the sending side of the broadcast system.

The principle of this invention will be better understood from the following more detailed discussion taken in conjunction with the accompanying drawings, in which the same or equivalent parts are designated by the same reference numerals, characters and symbols, and in which.

Figure 1:
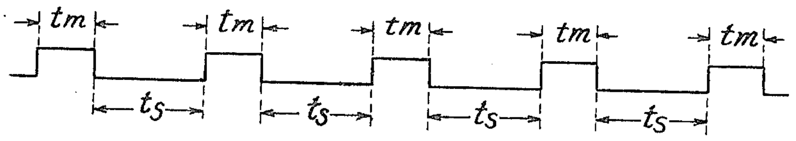
FIG. 1 is a time chart explanatory of an example of a control signal used in the system of this invention.
Figure 2:
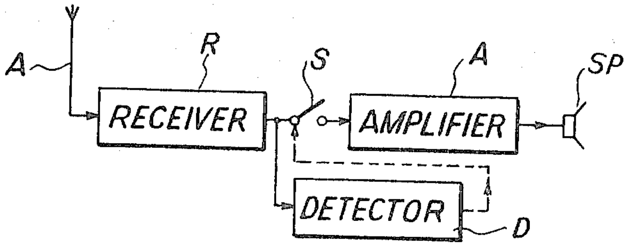
FIG. 2 is a block diagram for illustrating an example of a receiving set used in the system of this invention.

The principle of this invention will now be described below. In this case it is assumed that the format of the control signal and the operation principle of the detection circuit for the control signal are as follows in this invention:

1. At first, the format of the control is a single wave or a plurality of waves each of which is a sinusoidal wave amplitude modulated by a rectangular wave. If a single wave is adopted, a control signal is composed of $n$-mark signals each having a duration $t_m$ as shown in FIG. 1. Adjacent two marks signals are separated by a space lasting a duration $t_s$.
2. The control signal mentioned above is transmitted from the sending side of the emergency broadcast system and received by an antenna A and a receiver R of the receiving side shown in FIG. 2. The received control signal is detected by a detector D which controls a switch S so as to connect the receiver R to an amplifier A. Accordingly, emergency broadcast information transmitted after the control signal can be received from a speaker SP.

In this case, the operation of the detector D is performed in accordance with the following principles.

2 a. Narrow passband filter

In the detector D, there is provided with a narrow passband filter which passes signals of a frequency range $f_o \pm \Delta f$, where "$f_o$" is the predetermined frequency of the control signal and "$\Delta f$" is a small frequency determined in consideration of deviations of the frequency of the control signal and of the characteristic constant of the narrow band-pass filter. In actual case, the waveform of the control signal passed through the narrow passband filter is an intermittent sinusoidal wave, in which durations of mark signals and space signals are not equal to one another and the envelope of the mark signal is not a rectangular wave but an irregular waveform.

2b. The operation after the narrow passband filter i. If the duration of a space of a false signal like as the control signal is less than a time $t_1$ (shorter than the duration $t_s$ of the space shown in FIG. 1), this false signal is not contributory to the operation of the detector D.

ii. If the duration of a space of a false signal like as the control signal is more than a time $t_2$ (sufficiently longer than the duration $t_s$), this false signal is not contributory to the operation of the detector D.

iii. If $n$ false signals each separated by a space lasting a time more than the time $t_1$ and less than the time $t_2$ are received by the detector D, the detector D will perform spurious triggering. This spurious triggering must be eliminated before the occurrence thereof.

3. The principle of eliminating operation of the false signals at the sending side of the emergency broadcast signal in accordance with this invention is as follows:

3a. To eliminate the false signals from the broadcast signal at the sending side of the broadcast system, detection ma. means is provided at the amplification circuitry of the sending side to detect the false signals. When the detection means detect a false signal at a time just preceding to the spurious triggering of the receiving side, a band elimination filter is automatically inserted in the amplification circuitry for the program information of the broadcast system to eliminate the false signals from the broadcast signal at the sending side of the broadcast system.

3b. In this case, the detection means is formed in accordance with the following operating principles:

i. The program signal is applied to a narrow passband filter having a passband $f_o \pm \Delta f$, so that frequency components $f_o \pm \Delta f$ (i.e., false signal) is selected from the program signals. This false signal is generally irregular, intermittent signals. This false signal is amplified and rectified so that a direct-current signal of irregular, intermittent wave is obtained. The above-mentioned narrow passband filter, the amplifier and the rectifier form a pickup circuit.

ii. Decision circuit

Figure 4:
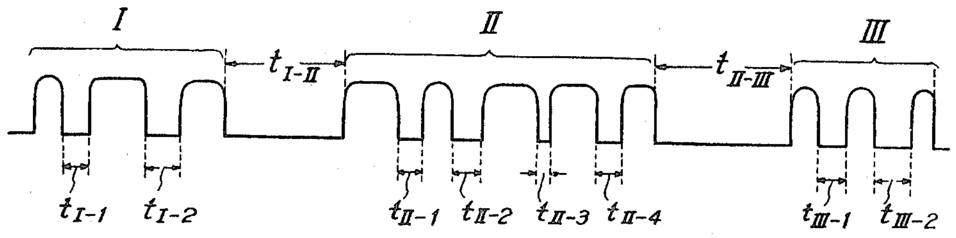
FIGS. 4 and 5 are time charts explanatory of the principle of this invention.
Figure 5:
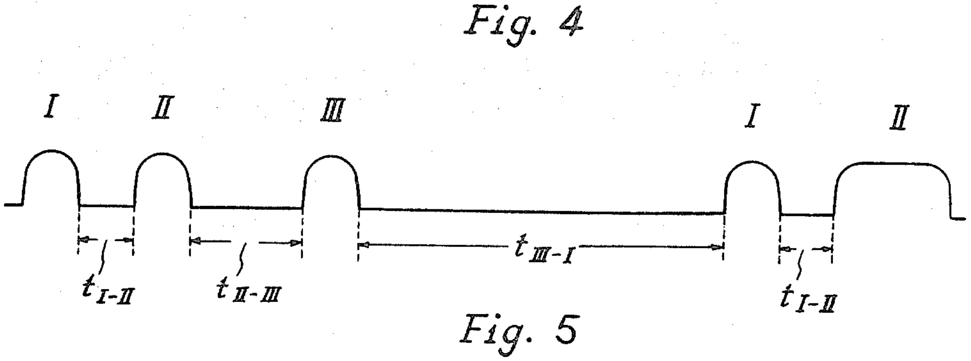

The direct-current signal obtained at the pickup circuit is applied to this decision circuit. This decision circuit performs the following four operations.

iia. A first decision operation: durations of intermittent times in the false signal are measured so that intermittent direct-current separated by at least one intermittent time ($t_{I-1}$, $t_{I-2}$, $t_{II-1}$, $t_{II-2}$, $t_{II-3}$, $t_{II-4}$, $t_{III-1}$, $t_{III-2}$) less than the time $t_1$ are deemed as a single group of false signals and so that two intermittent direct-current signals separated by an intermittent time ($t_{I-III}$, $t_{II-III}$) more than the time $t_1$ are deemed as two distinct groups of false signals. The number of groups is counted. (See FIG. 4)

iib. A second decision operation: an intermittent time between a $N$th group of false signals and a ($n$+1)th group of false signals detected in accordance with the first decision operation is measured so that if the measured intermittent time is less than a time $t_2$ (longer than the time $t_1$), the $n$th group and the ($n$+1)th group are deemed as "continuous." However, if the intermittent time measured is more than the time $t_2$, the counted result is cleared and the ($n$+1)th group of false signals is deemed as a new first group of false signals. (See FIG. 5)

iic. A third decision operation: in view of the operation principle of the receiving side, if it is assumed that a band-elimination filter is inserted in the program circuitry in response to the $n$th false signal to eliminate the passband $f_o \pm \Delta f$, detection of the $n$th false signal is performed so that a first switch signal is applied to a succeeding control circuit in response to the start or end of the $n$th false signal to insert the band-elimination filter.

iid. A fourth decision operation: a time starting from the first switch signal is measured. When the time measured reaches a time $t_3$ predetermined in consideration of the operation principle of the receiving side, a second switch signal is applied to the control circuit to remove the band elimination filter from the program circuitry.

iii. control circuit

This control circuit receives the first and second switch signals from the preceding decision circuit and performs operations for inserting the band-elimination filter in the program circuitry and for removing the band-elmination filter from the program circuitry in response to the first switch signal and the second switch signal respectively.

For ready understanding of this invention an example of the circuitry at the sending side applied to the emergency broadcast system will be summarily described below with reference to FIG. 3. This circuitry comprises an input terminal 1 to apply the broadcast program signals, a terminal 2 to apply the emergency control signal, switches 3 and 5, a band-elimination filter 4 to eliminate a frequency or frequencies of the emergency control signal, a unidirectional amplifier 6, a transmitter 7 including a modulator, a false signal detector 8 which detects a signal similar to the regular emergency control signal (i.e., "the state just before the possible spurious triggering of the receiving side"), a control circuit 9 to switch the switches 3 and 5 in response to the output of the false signal detector 8, and an antenna 10.

Figure 3:
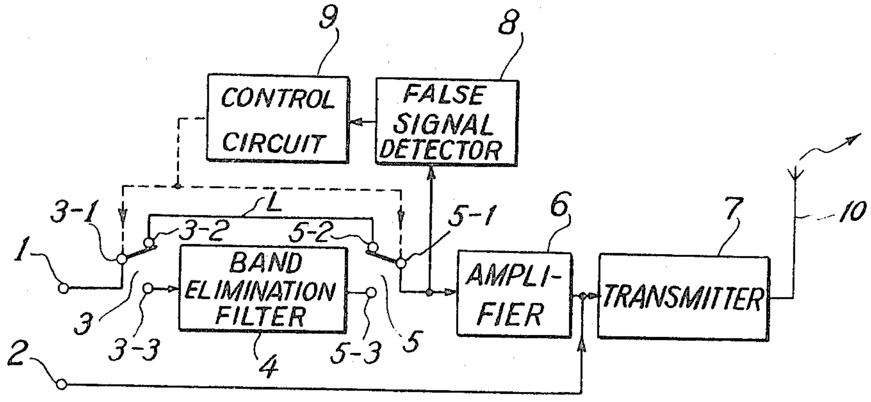
FIG. 3 is a block diagram explanatory of the construction of the sending side in the system of this invention.

In the normal condition of this circuitry, the switches 3 and 5 are restored as shown in FIG. 3 so that contacts 3-1 and 3-2 and contacts 5-1 and 5-2 are respectively connected to each other. Accordingly, the broadcast program signals from the terminal 1 passes through a line L and the amplifier 6 and then sent out from the transmitter 7 and the antenna 10, on the air to a number of receivers (not shown). The false signal detector 8 detects "the state just before the possible spurious triggering of the receiving side." As mentioned above, if the regular emergency control signal is formed by five intermittent pulses of a signal wave, the false signal detector 8 determines as "the state just before the possible spurious triggering of the receiving side" when three or four of the intermittent pulses are detected in it. At this time, the false signal detector 8 generates the first switch signal and the second switch signal as mentioned below and applies to the control circuit 9 to switch the switches 3 and 5 during a predetermined time ($\tau$) only. Accordingly, if the false signal detector 8 produces the first switch signal, the broadcast program signals pass through the terminal 1, the contact 3-1, the contact 3-3, the band-elimination filter 4, the contact 5-3, the contact 5-1 and the amplifier 6 and is applied to the transmitter 7. Therefore, false signals having the possibility of the spurious triggering cannot be transmitted on the air from the antenna 10. In this circuitry, it is desirable that the filter provided in the false signal detector 8 has a relatively wide passband so as to cover the staggered frequency characteristics of substantially all the selection filters which would be provided at a number of receivers.

Since the regular emergency control signal applied from the terminal 2 is combined with the broadcast program signals after the unidirectional amplifier 6, there is no chance where the regular emergency control signal is checked by the band-elimination filter 4 and no chance where the control circuit 9 carries out its control operation in response to this regular emergency control signal. Accordingly, the possibility of the spurious triggering can be completely eliminated at each of the receivers which receive the broadcast information transmitted from the circuitry of FIG. 3. Moreover, the regular emergency control signal is exactly received at each of the receivers, so that the emergency information broadcast after the emergency control signal is exactly received also.

Figure 6:
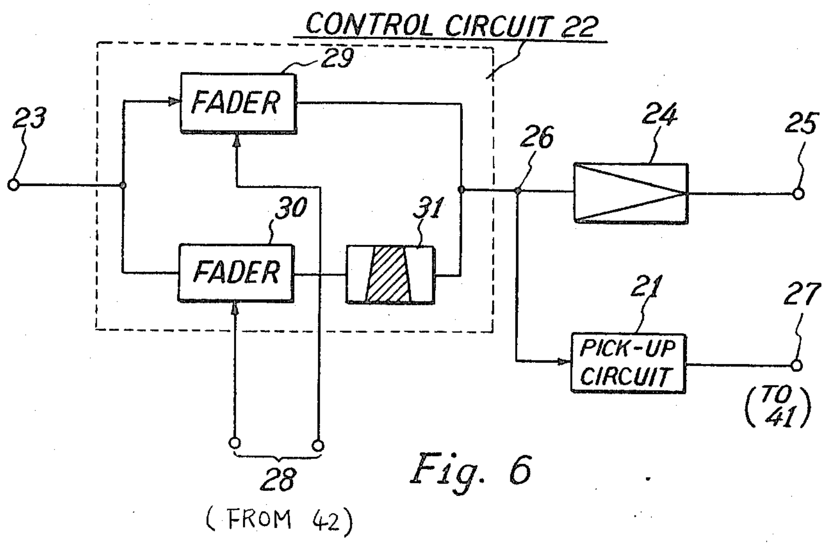
FIG. 6 is a block diagram for illustrating examples of a control circuit and a pickup circuit used in the system of this invention.

With reference to FIGS. 6, another example of the control circuit will be described. In this example, program signals are applied to an input terminal 23 and passes through a control circuit 22 and an amplifier 24. Output program signals obtained at an output terminal 25 are applied to other studio devices (not shown). The control circuit 22 comprises faders 29 and 30 and a band-elimination filter 31. Each of the faders 29 and 30 comprises, for example, a bridge circuit of four resistances one of which is a variable resistance. If the first switch signal (hereinafter referred as "control state S") is applied to terminals 28, the fader 29 passes therethrough the program signals without attenuation while the fader 30 attenuates the program signals. On the other hand, if the second switch signal (hereinafter referred as "control state $\bar{S}$") is applied to the terminals 28, the fader 29 attenuates the program signal while the fader 30 passes through the program signals. In this case, false signals included in the program signals are eliminated by the band-elimination filter 31. The switch signals are obtained from the decision circuit mentioned below with reference to FIG. 7. A pickup circuit 21 branches the program signals from a point 26 and applies them from a terminal 27 to the decision circuit after rectification.

Figure 7:
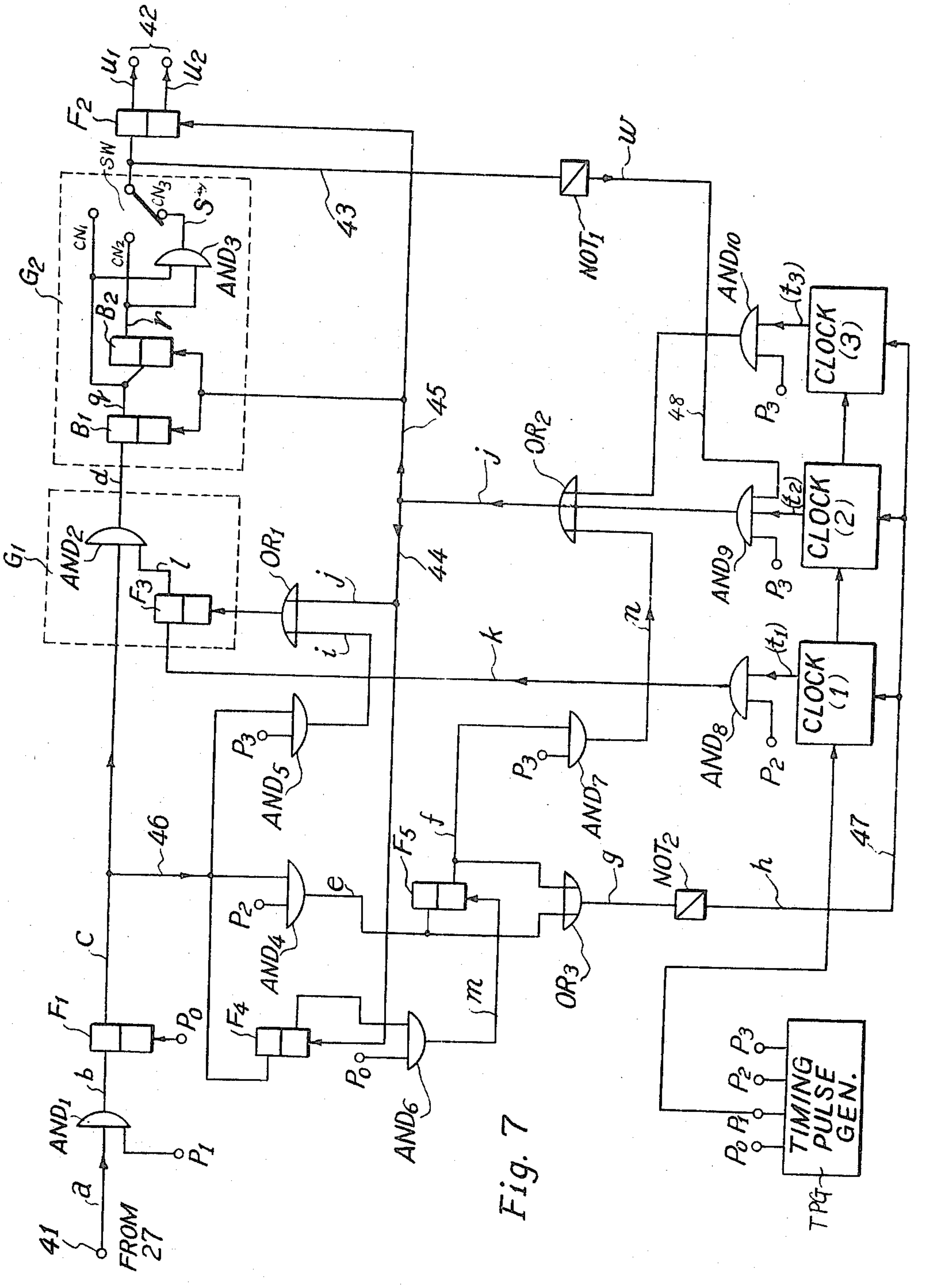
FIG. 7 is a connection diagram for illustrating an example of a decision circuit used in the system of this invention.
Figure 8:
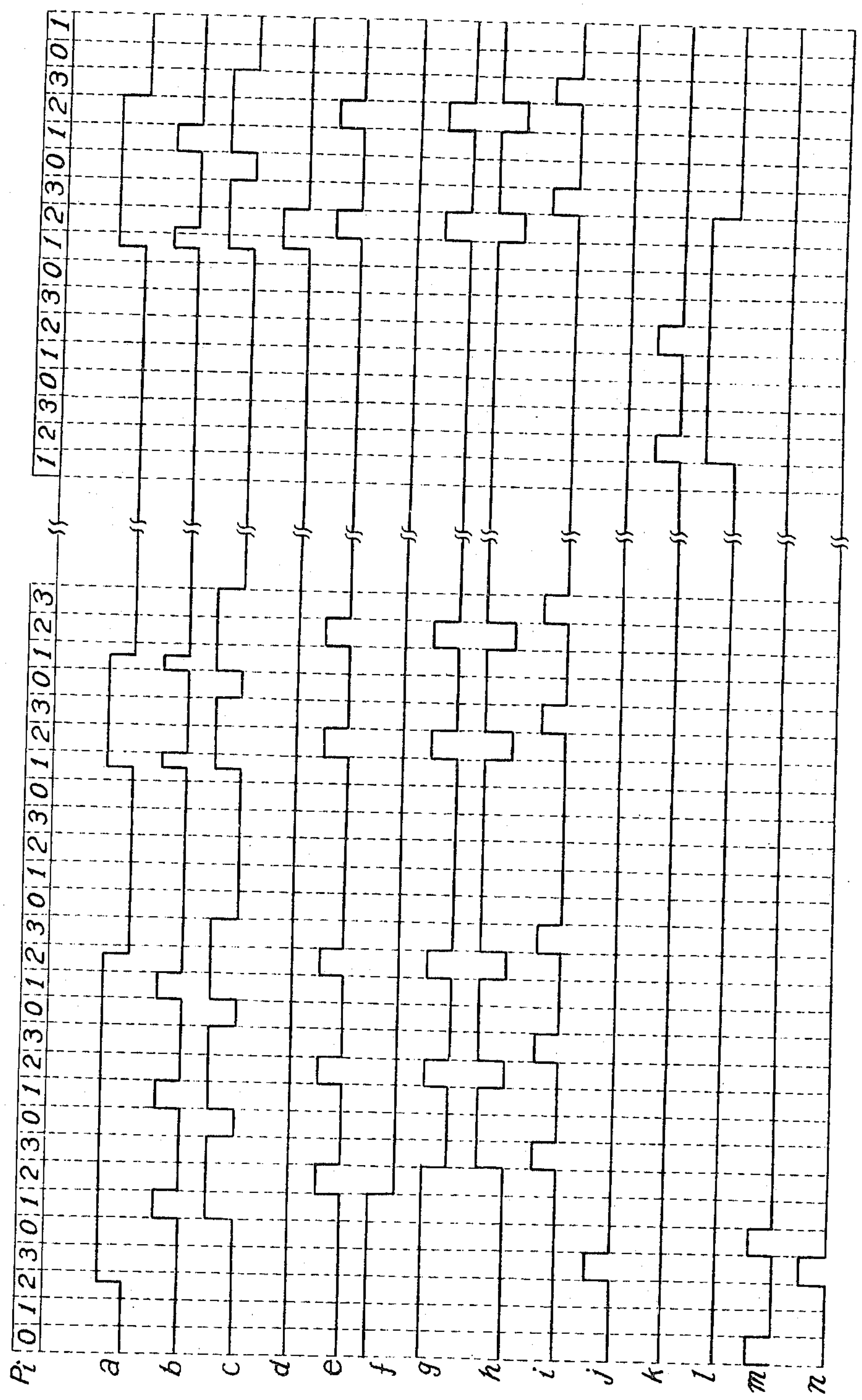
FIGS. 8 and 9 are time charts explanatory of the operation of the diagram shown in FIG. 7.
Figure 9:
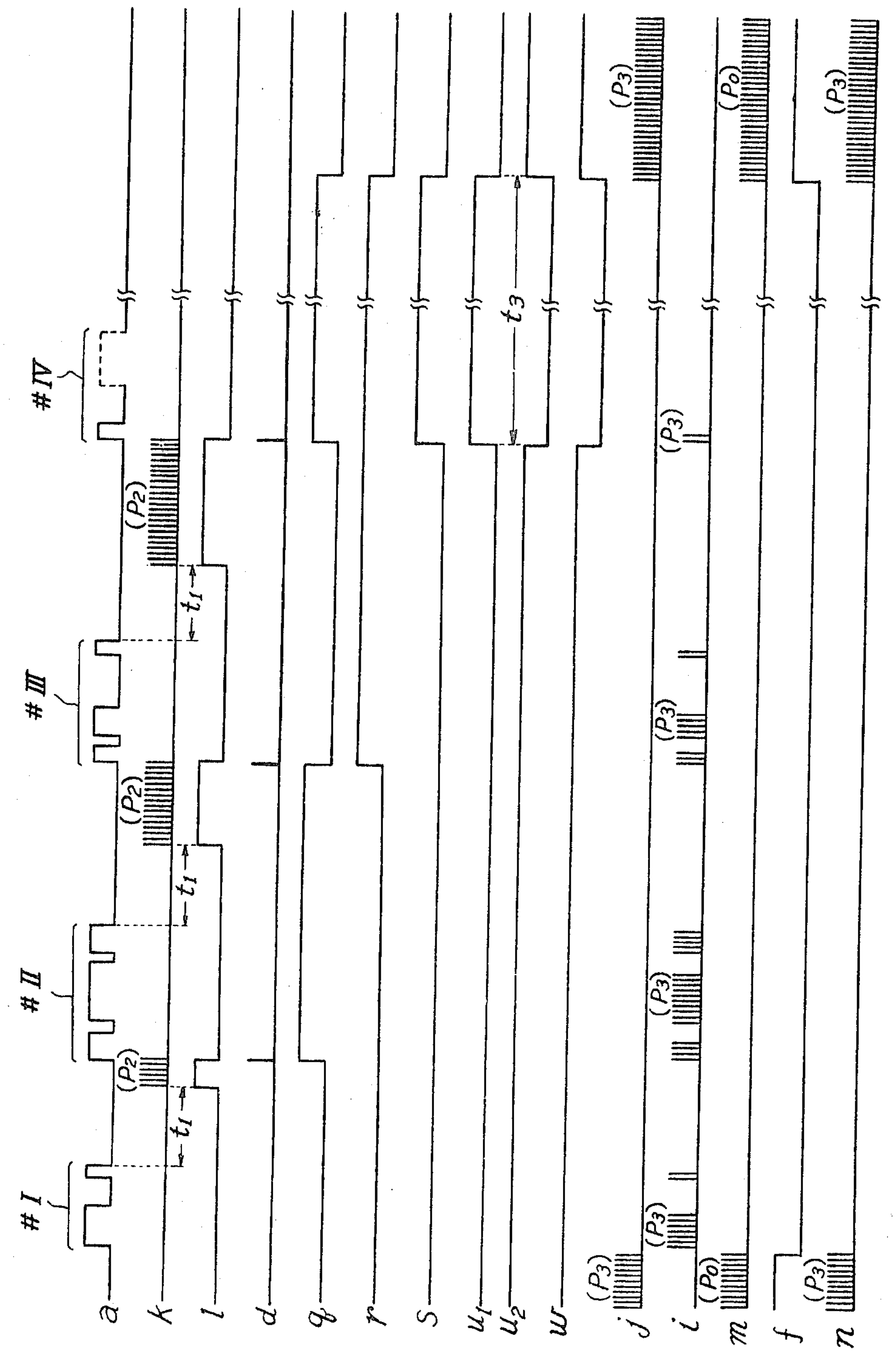

With reference to FIGS. 7, 8 and 9, an example of the decision circuit will be described. A timing pulse generator TPG generates pulse trains $P_o$, $P_1$, $P_2$ and $P_3$ timed respectively with time slots "0," "1," "2" and "3" in a time slot train $P_i$ shown in FIG. 8. Therefore, pulses of the pulse trains $P_o$, $P_1$, $P_2$ and $P_3$ are timed successively with time slots "0," "1," "2" and "3" in the time slot train $P_1$. A clock (1), a clock (2) and a clock (3) are each a binary counter and connected in cascade arrangement. The clock (1) is driven by the pulse train $P_1$ so as to generate clock pulses ($t_1$ having a period $t_1$. The clock (2) is driven by the output pulses of the clock (1) so as to generate clock pulses ($t_2$) having a period $t_2$. The clock (3) is driven by the output pulses of (2) clock two so as to generate clock pulses ($t_3$) having a period $t_3$.

The operation of this decision circuit will be described with reference to FIGS. 8 and 9. In this case, reference characters designated at respective time charts in FIGS. 8 and 9 are identical with the respective reference characters in FIG. 7 so as to designate respective waveforms of corresponding parts.

At first, the function of a first gate $G_1$ will be described. A false signal $a$ detected by the pickup circuit 21 is applied, through the terminal 27 and a terminal 41, to an AND-circuit $AND_1$, in which the false signal $a$ is converted to a signal $b$ by sampling by the pulse train $P_1$. This sampling is performed for converting the false signal (usually received at random) to false pulses timed with the timing of this decision circuit. The false pulses $b$ are applied to a bistable circuit $F_1$ to set this bistable circuit $F_1$ to its set state. The bistable circuit $F_1$ is reset by pulses of the pulse train $P_o$. Therefore, the false pulses $b$ are converted to an intermittent signal $c$ having durations each lasting the time slots of the timing pulse trains $P_1$, $P_2$ and $P_3$ and having intermittent times each lasting the time slot of the timing pulse train $P_o$. This intermittent signal $c$ is applied to an AND-gate $AND_2$ of the first gate $G_1$.

Another input $l$ (i.e., gate pulse) of the AND-gate $AND_2$ is applied from a bistable circuit $F_3$. This input $l$ is generated in response to a pulse generated from the clock (1) when a time starting from the end of a group of false signals reaches the time $t_1$ (e.g., 0.5 seconds). This input $l$ will be further described below. The bistable circuit $F_3$ is reset by a pulse $i$ obtained by sampling the intermittent pulse $c$ in an AND-gate $AND_5$ by use of the pulse train $P_3$.

If the intermittent signal $c$ is applied to the AND-gate $AND_2$ at a time where this AND-gate $AND_2$ is opened by the gate pulse, only the starting part of a first signal of the group of false signals passes through the AND-gate $AND_2$ since the AND-gate $AND_2$ is closed at once to check the succeeding part of the group of false signals in response to the reset of the bistable circuit $F_3$. Accordingly, only the starting part of each of the groups of false signals passes through the gate $G_1$ and is applied to a second gate $G_2$. As understood from the above operation, this first gate $G_1$ performs the aforementioned first decision operation.

Next, the function of the second gate $G_2$ will be described. This second gate $G_2$ comprises two binary counters $B_1$ and $B_2$, an AND-gate $AND_3$ and a manual switch SW. The switch SW has possible three connection states in this example in consideration of the format (five pulses) of the control information. If the switch SW is connected to a connection $CN_1$, the binary counter $B_1$ is set in response to the first signal of the second groups of false signals. The output $q$ of the set binary counter $B_1$ passes through the switch SW and sets a bistable circuit $F_2$. The reset condition and the set condition of this bistable circuit $F_2$ correspond respectively to the above mentioned control states S and $\bar{S}$.

If the switch SW is connected to a connection $CN_2$, the binary counter $B_2$ is set in response to the first signal of the third groups of false signals. The output $r$ of the set binary counter $B_2$ passes through the switch SW and sets the bistable circuit $F_2$ to change the control state S to the control state $\bar{S}$.

Moreover, if the switch SW is connected to a connection $CN_3$, the AND-gate $AND_3$ generates an output $s$ in response to the output $q$ of the binary counter $B_1$ generated by the first signal of the fourth groups of false signals and the output $r$ of the binary counter $B_2$ storing the receiving of the third group of false signals. The output $s$ passes through the switch SW and sets the bistable circuit $F_2$ to change the control state S to the control state $\bar{S}$.

In each of the above connection states $CN_1$, $CN_2$ and $CN_3$ of the switch SW, the bistable circuit $F_2$ is reset after the time $t_3$ (e.g., 2.5 seconds) starting from the set instant thereof by a reset pulse $j$ applied from the clock (3) through an AND-gate $AND_{10}$ and an OR-gate $OR_2$.

As mentioned above, this gate $G_2$ performs the third and fourth decision operations. In this case, the number of the groups of false signals to change the control state S to the control state $\bar{S}$ is determined by manual setting of the switch SW in consideration of the format (e.g., five pulses) of the control information of the broadcast system.

Moreover, the gates $G_1$ and $G_2$ perform the aforementioned second decision operation in cooperation with each other. When the gate $G_1$ is awaiting a succeeding intermittent signal $c$ after the time $t_1$ starting from the termination of the last signal of the just preceding group of false signals, a signal on a line 43 assumes the state "0." Accordingly, a signal $W$ on a line 48 connected to a NOT-circuit $NOT_1$ assumes the state "1." After the time measuring of the time $t_1$ by the clock (1), the clock (2) starts the time measuring of the time $t_2$ (e.g., 15 seconds). If a succeeding group of false signals is not received by the expiration of the time $t_2$, a pulse of the clock pulse train ($t_2$) is generated from the clock (2) and passes through an AND-gate $AND_9$ which is opened by the state "1" of the output of the NOT-circuit $NOT_1$. This pulse passes through an OR-gate $OR_2$ to reset the binary counters $B_1$ and $B_2$ of the gate $G_2$ and further passes the OR-gate $OR_1$ to reset the bistable circuit $F_3$ of the gate $G_1$. In response to the pulse passed through the OR-gate $OR_2$, bistable circuits $F_4$ and $F_5$ are successively set to the state "1" so that a signal $h$ on a line 47 assumes the state "0." Therefore, all of the clocks (1), (2) and (3) are reset.

As mentioned above, the gates $G_1$ and $G_2$ performs the first, second, third and fourth decision operations in cooperation with other circuit elements in Fig. 7.

With reference to the operation of the gate $G_1$, additional explanations are described below. The intermittent signal $c$ passes through a branch line 46, an AND-gate $AND_4$, (the bistable circuit $F_5$), an OR-circuit $OR_3$ and a NOT-circuit $NOT_2$, to the clocks (1), (2) and (3) to reset them. In other words, if the false signal terminates, the signal $h$ on a line 47 assumes the state "1" to start the clocks (1), (2) and (3) for measuring times starting from the start of the false signal. However, the signal $h$ assumes the state (0) in response to the false signal so that the clocks (1), (2) and (3) stop their counting operations for measuring the times. Accordingly, the clocks (1), (2) and (3) start the respective time-measuring operations in response to the interruption of the false signal, while the results of the time-measuring operations are all cleared at once. If any of succeeding false signals is not received within a time after starting of the clock (1), this clock (1) generates a pulse of the pulse train ($t_1$), which passes through an AND-gate $AND_8$ to set the bistable circuit $F_3$. Accordingly, the gate $G_1$ is opened.

If a succeeding pulse is obtained at the line 46 at the open period of the gate $G_1$, this succeeding pulse passes through the AND-gate $AND_5$ and the OR-gate $OR_1$ so that the bistable circuit $F_3$ is reset. Therefore, only the starting part of a group of false signal can be passed through the gate $G_1$.

In order to realize the reliable operation of the decision circuit, erroneous setting or resetting of the bistable circuits and of the binary counters caused by noise applied from the power source, etc. must be eliminated. For this purpose, the bistable circuits $F_4$ and $F_5$ are always set to the state "1" in case of no signal on the line 46 before receiving the first group of false signals. Moreover, the AND-gate $AND_7$ is opened in time with pulses of the pulse train $P_3$. Therefore, pulses passed through the AND-gate $AND_7$ and timed with the pulse train $P_3$ reset each of the bistable circuit $F_2$, $F_3$ and $F_4$ and the binary counters $B_1$ and $B_2$ so that this decision circuit are periodically reset to the correct standby condition in time with the pulse train $P_3$.

In Fig. 8, examples of waveforms of respective parts of the decision circuit shown in Fig. 7 are illustrated in case of changing the control state "S" to the control state "$\overline{S}$" in response to a second group of false signals. In this Fig. 8, three input false signals *a* are shown. In this case, since a space time between the first signal and the second signal is less than the $t_1$, these first and second signals are deemed as "continuous" (i.d., a first group of false signals). However, since a space time between the second signal and the third signal is more than the $t_1$, the third signal is deemed as a second group of false signals. Other waveform charts will be readily understood from the above-mentioned operation of the decision circuit. Accordingly, details are omitted.

FIG. 9 shows waveforms of respective parts of the decision circuit shown in FIG. 7 in connection with the operation of the gate $G_2$ in case where a first group of false signals No. I, a second group of false signals No. II, a third group of false signals No. III and a fourth group of false signals No. IV are received to switch the control state "S" to the control state "$\overline{S}$" in response to the fourth group of false signals No. IV.

In actual cases, many modifications will be applied to the circuitry of this invention mentioned above. By way of example, the insertion of the band-elimination filter 4 or 31 can be performed in accordance with gradual steps to reduce perfectly offense to the ear. In case of the faders 29 and 30, each of the faders 29 and 30 may be provided with a plurality of taps on the variable resistor so that these taps are switched successively in accordance with the successive receiving of incoming groups of false signals No. I, No. II. . . . Moreover, the removing of the band-elimination filter 4 or 31 may be performed at the interruption time of the program signal by means of other additional circuit.

What I claim is:

1. A broadcast system for transmitting an intermittent control signal from the sending side to the receiving side to trigger the receiving side by the control signal, comprising elimination means for eliminating the same frequency components as the control signal from broadcast-signals being transmitted through a transmission medium of the broadcast system, detection means for detecting from the broadcast-signals a false signal similar to the control signal before the receiving side is spuriously triggered by the false signal, and control means for inserting and removing the elimination means into and from the path of the broadcast-signals; the detection means comprising a pickup circuit for deriving the same frequency components as the control signal from the broadcast-signals, a first decision means for deciding false signals having only spaces each less than a first time $t_1$ as a signal group of false signals, a second decision means for deciding successive two groups of false signals detected by the first decision means "continuous" if a space between the successive two groups of false signals is less than a second time $t_2$ than the first time $t_1$ and for deciding the later of successive two groups of false signals detected by the first decision means as a new group of false signals if a space between the successive two group of false signals if a space between the successive two groups of false signals is longer than the second time $t_2$, and a third decision means for detecting a predetermined state just before the possible spurious triggering of the receiving side when the number of "continuous" groups of false signals reaches a predetermined number.

2. A broadcast system according to claim 1, in which the detection means further comprises a fourth decision means for measuring a third time starting from the insertion of the elimination means to remove the elimination means from the path of the broadcast-signals when the third time measured exceeds a predetermined time.

3. A broadcast system according to claim 1, in which the third decision means is provided with means for varying the predetermined number.

* * * * *